United States Patent [19]
Petzetakis

[11] 3,870,441
[45] Mar. 11, 1975

[54] PRODUCTION OF POLYMERIC FOAM

[75] Inventor: Nicholas George Petzetakis, Athens, Greece

[73] Assignee: Unifoam AG, Glarus, Switzerland

[22] Filed: Sept. 10, 1973

[21] Appl. No.: 395,607

[30] Foreign Application Priority Data
Sept. 11, 1972 Great Britain..................... 42008/72

[52] U.S. Cl.................. 425/4 C, 264/47, 425/115, 425/224, 425/329, 425/817 C
[51] Int. Cl......................................... B29d 27/04
[58] Field of Search........ 425/4 C, 817 C, 110, 115, 425/224, 329; 264/47, 48, 54, 171, 216, 471

[56] References Cited
UNITED STATES PATENTS

| | | | |
|---|---|---|---|
| 3,488,800 | 1/1970 | Kornylak............................. | 425/4 C |
| 3,659,981 | 5/1972 | Ferstenberg..................... | 425/4 C X |
| 3,768,937 | 10/1973 | Haga et al........................... | 425/4 C |
| 3,786,122 | 1/1974 | Berg................................ | 425/4 C X |

Primary Examiner—R. Spencer Annear
Assistant Examiner—Mark Rosenbaum
Attorney, Agent, or Firm—Lawrence E. Laubscher

[57] ABSTRACT

In the Berg U.S. Pat. Nos. 3,786,112 and 3,832,099 there is described an apparatus for producing a continuous strand of polymeric foam from a mixture of liquid reactants, in which expanded foam is formed in a continuously moving channel-shaped conveyor, comprising a vessel in which liquid foam reactants may expand upwardly, means for supplying liquid foam reactants to said vessel, a weir structure associated with said vessel so that foam rising by expansion in said vessel will flow over said weir structure, and a channel-shaped conveyor associated with said weir structure and arranged continuously to convey foam away from said weir structure.

In the embodiments described in the aforesaid co-pending application, the side walls of the channel-shaped conveyor constitute upward extensions of the side walls of the vessel. The present invention provides a modification in that the vessel includes means for assisting partially-expanded foam to flow over the weir comprising upward extensions which are continuously movable around the whole rim of the vessel, except the front portion, towards the weir. Conveniently, the upward extension of the rear wall of the vessel may be constituted by the side walls of the channel shaped conveyor.

8 Claims, 3 Drawing Figures

PRODUCTION OF POLYMERIC FOAM

This invention relates to the continuous production of polymeric foam strands, e.g., continuous strands of polyurethane foam.

In the Berg U.S. Pat. Nos. 3,786,112 and 3,832,099 described an apparatus for producing a continuous strand of polymeric foam from a mixture of liquid reactants, in which expanded foam is formed in a continuously moving channel-shaped conveyor, comprising a vessel in which liquid foam reactants may expand upwardly, means for supplying liquid foam reactants to said vessel, a weir structure associated with said vessel so that foam rising by exapnsion in said vessel will flow over said weir structure, and a channel-shaped conveyor associated with said weir structure and arranged continuously to convey foam away from said weir structure.

According to the present invention, there is provided apparatus for the continuous production of polymeric foam from a mixture of liquid foam reactants, comprising an open-topped vessel in which liquid foam reactants may expand upwardly, means for supplying liquid foam reactants to the bottom of said vessel, a weir structure associated with a forward portion of the rim of said vessel so that foam rising by expansion in said vessel will flow as partially expanded foam over said weir structure, a channel-shaped conveyor associated with said weir structure and arranged continuously to convey partially expanded foam away from said weir structure, the foam completing the expansion process within said channel-shaped conveyor, and means for assisting partially expanded foam to flow over said weir structure comprising upward extensions of said vessel which are continuously movable around the whole rim of said vessel, except said forward portion, towards said weir.

Conveniently, the upward extensions of the vessel are constituted by the same sheets of material (e.g., kraft paper) which constitute the two side walls of said channel-shaped conveyor.

However, according to another aspect of the present invention there is provided apparatus for the continuous production of polymeric foam from a mixture of liquid foam reactants, comprising an open-topped vessel in which liquid foam reactants may expand upwardly, means for supplying liquid foam reactants to the bottom of said vessel, a weir structure associated with a forward portion of the rim of said vessel so that foam rising by expansion in said vessel will flow as partially expanded foam over said weir structure, a channel-shaped conveyor associated with said weir structure and arranged continuously to convey partially expanded foam away from said weir structure, the foam completing the expansion process within said channel-shaped conveyor, the two side walls of said channel-shaped conveyor each comprising a sheet of material (e.g., kraft paper) which is drawn from a supply roll and initially passes around part of the rim of said vessel so as to constitute an upward extension of said vessel moving in the direction of said channel-shaped conveyor and tending to move partially expanded foam rising out of said vessel towards said weir structure, the two sheets of material between them passing around substantially the whole rim of said vessel except for said forward portion of the rim before continuing to constitute said side walls of the channel-shaped conveyor.

The present invention will be described, by way of example only, with reference to the accompanying drawings, in which.

Figure 1:
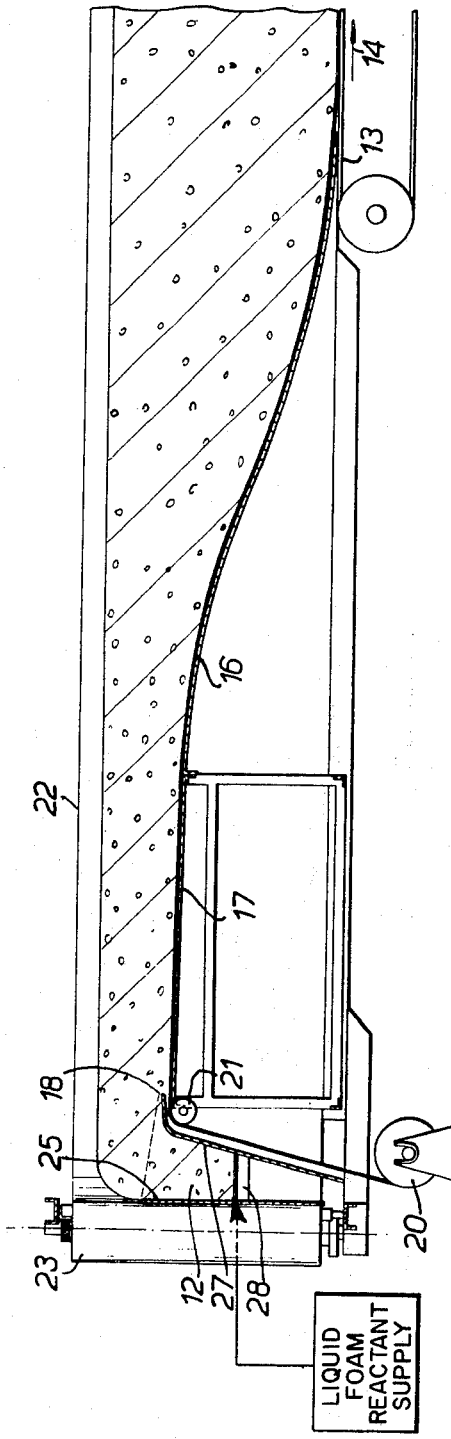
FIG. 1 is a cross-sectional elevational view of apparatus according to the invention.

Referring to the drawings, the apparatus comprises a vessel in the form of a trough 12 and a belt conveyor 13 which has its conveying reach arranged to move horizontally in the direction of arrow 14, over a stationary supporting platform. Between the conveyor 13 and the trough 12 are arranged an inclined fall plate 16 and a support member 17 having minimal spacing from a lip 18 of the trough 12. A sheet of material 19, for example kraft paper, from a supply roll 20 passes upwardly and around a roller 21 below the trough lip 18, over the support member 17, over the inclined surface of the fall plate 16, and onto the conveying reach of the conveyor 13 to move thereafter with said conveyor.

Contiguous with each edge of the sheet 19 is a vertical side sheet 22, of material which also may be kraft paper, drawn from a respective supply roll 23, by means not shown, in the conveying direction of arrow 14 and at the same speed at the conveyor 13. The side sheets 22 are supported by respective rigid side walls 24 and constitute, with the bottom sheet 19, an open-topped channel conveyor.

The trough 12 comprises an upright rear wall 25 and side walls 26 of similar height. The front wall 27 of the trough is inclined to rise from a base 28 of the trough to the trough lip 18. The lower part of the trough can be divided into sections by baffle plates and each section may be fed so that each trough section receives mixture from the mixing head which is the same age (i.e., has travelled the same distance) as that received by all the other sections. If desired, the baffle plates can extend along the length of the trough, the plates being spaced from each other across the trough width. Such plates can also be spaced from the bottom of the trough. Alternatively, instead of baffle plates, a perforated false floor can be provided across the trough.

Liquid foam reactants can be supplied from a mixing head to the bottom of the trough, in a manner similar to the described in the aforementioned patents. Alternatively, the reactants are fed to the trough by pipes which enter from above the trough and extend downwardly against the rear wall 25 of the trough towards the trough bottom. The mixing head and supply means for the reactants are not shown in order to avoid unnecessary complication of the drawings.

In accordance with the present invention, each side sheet 22 is directed from its supply roll 23 towards a respective upright guide blade 30. The two guide blades 30 are located as close as possible to each other, whilst allowing the two side sheets 22 to pass between their adjacent edges, and also the guide blades are preferably located mid-way across the trough and the channel conveyor (as viewed in plan). Furthermore, the guide blades are located adjacent the rear wall 25 of the trough.

Figure 2:
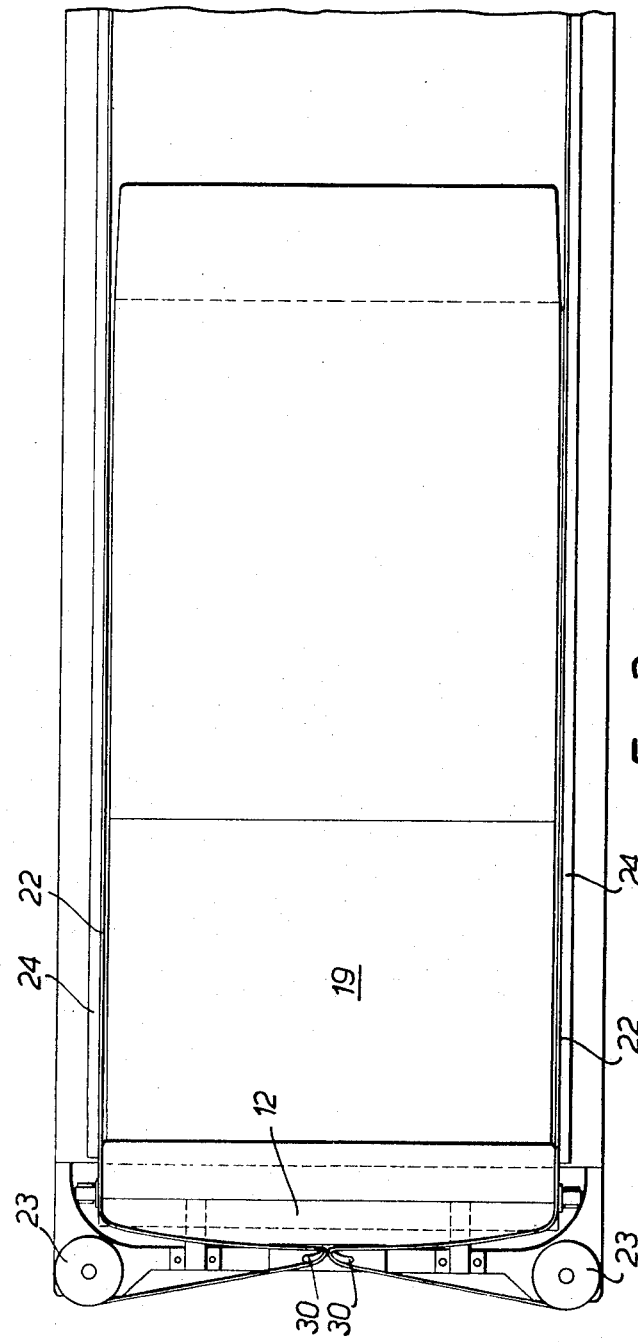
FIG. 2 is a plan view of apparatus according to the invention.

After passing between the guide blades, each side sheet 22 is returned around the outer wall of the trough 12 so that it thereafter follows the line of the channel conveyor. The shape of the trough 12 (as seen in plan in FIG. 2) is chosen to provide a smooth path for the side sheet 22.

Figure 3:
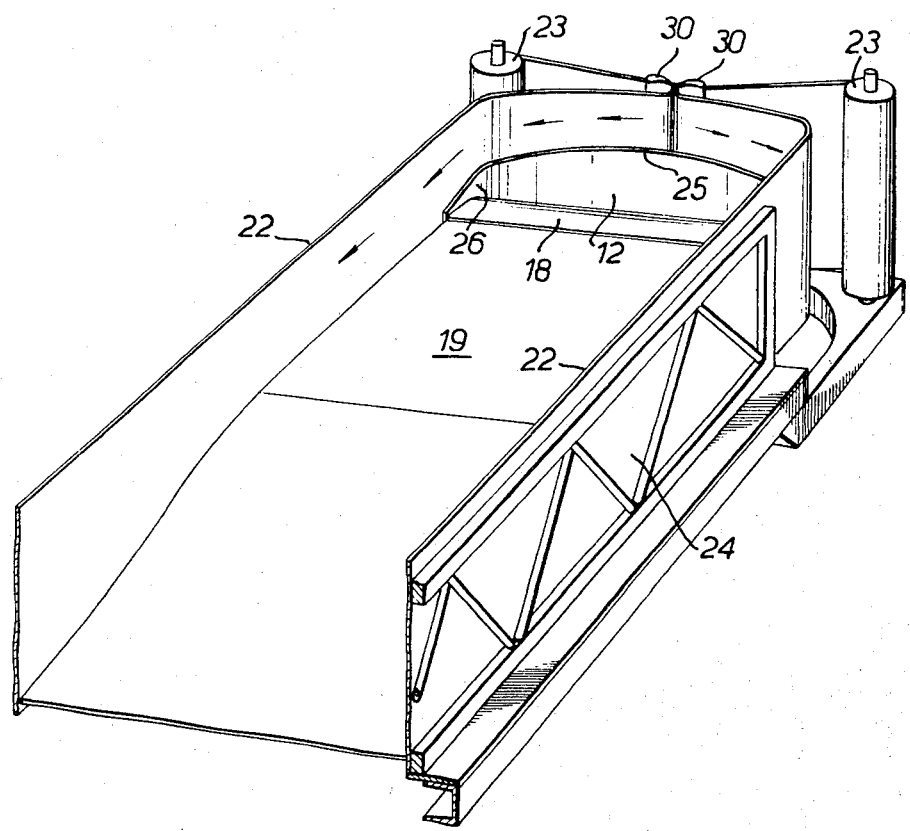
FIG. 3 is a perspective view of the apparatus shown in FIGS. 1 and 2, in the absence of polymeric foam.

As will be seen from FIGS. 1 and 3, the side sheets 22 must extend above the upper limits of the trough 12, with the object that foam rising from the trough will be driven by the side sheets 22 to pass over the weir structure comprising the trough lip 18. If necessary, suction devices can be provided to act on the upper edge regions of the outer surfaces of side sheets 22 to ensure that said edge regions do not fall inwardly towards the trough.

Although the foam is a semi-liquid as it rises out of trough 12, the guide blades 30 are set sufficiently close together that, with the forward transport of the side sheets 22, foam does not pass between the guide blades but is urged away from the gap between the blades and over the weir. If necessary, the upper edges of the sides of the trough 12 can be sloped downwardly towards the weir (as indicated in FIG. 1), so that the side sheets 22 will exert a sweeping action on the foam.

To facilitate free movement of the side sheets 22, the blades 30 may be provided with a friction-reducing coating such as polytetrafluoroethylene. Alternatively, the blades may be replaced by rollers.

The present invention is not limited in its application to the apparatus illustrated but may be applied to other forms of apparatus for producing polymeric foam strands, for example as described in the aforementioned co-pending application.

What we claim is:

1. Apparatus for the continuous production of polymeric foam from a mixture of liquid foam reactants, comprising an open-topped vessel in which liquid foam reactants may expand upwardly, means for supplying liquid foam reactants to the bottom of said vessel, a weir structure associated with a forward portion of the rim of said vessel so that foam rising by expansion in said vessel will flow as partially-expanded foam over said weir structure, a channel-shaped conveyor associated with said weir structure and arranged continuously to convey partially-expanded foam away from said weir structure, the foam completing the expansion process within said channel-shaped conveyor, and means for assisting partially-expanded foam to flow over said weir structure comprising upward extensions of said vessel which are continuously movable around the whole rim of said vessel, except said forward portion, towards said weir.

2. Apparatus as claimed in claim 1, in which said upward extensions of the vessel are constituted by the same sheets of material (e.g., kraft paper) which constitute the two side walls of said channel-shaped conveyor.

3. Apparatus as claimed in claim 2 comprising a pair of vertical guide blades located with minimum spacing inter se and from the rear portion of the rim of said vessel and located at a position opposite the mid-way point along said weir, each said sheet of material passing from a supply roll around one of said guide blades and then around the rim of said vessel thereafter to constitute a side wall of said channel-shaped conveyor.

4. Apparatus as claimed in claim 3, in which the surface of each guide blade, over which the associated sheet of material passes, is coated with polytetrafluoroethylene.

5. Apparatus as claimed in claim 2 comprising means for retaining said sheets in an upright position as they pass around the rim of said vessel.

6. Apparatus as claimed in claim 2, wherein the rim of said vessel except for said forward portion is shaped to facilitate transport of said sheets around said rim.

7. Apparatus as claimed in claim 2, wherein the rim of said vessel slopes downwardly towards said forward portion.

8. Apparatus for the continuous production of polymeric foam from a mixture of liquid foam reactants, comprising an open-topped vessel in which liquid foam reactants may expand upwardly, means for supplying liquid foam reactants to the bottom of said vessel, a weir structure associated with a forward portion of the rim of said vessel so that foam rising by expansion in said vessel will flow as partially expanded foam over said weir structure, a channel-shaped conveyor associated with said weir structure and arranged continuously to convey partially-expanded foam away from said weir structure, the foam completing the expansion process within said channel-shaped conveyor, the two side walls of said channel-shaped conveyor each comprising a sheet of material (e.g., kraft paper) which is drawn from a supply roll and initially passes around part of the rim of said vessel so as to constitute an upward extension of said vessel moving in the direction of said channel-shaped conveyor and tending to move partially expanded foam rising out of said vessel towards said weir structure, the two sheets of material between them passing around substantially the whole rim of said vessel except for said forward portion of the rim before continuing to constitute said side walls of the channel-shaped conveyor.

* * * * *